United States Patent [19]

Rainville

[11] 4,281,770

[45] Aug. 4, 1981

[54] BLOW MOLDED CONTAINER WITH SEPARATE HANDLE

[75] Inventor: Dewey Rainville, Westfield, N.J.

[73] Assignee: Rainville Company Inc., Middlesex, N.J.

[21] Appl. No.: 74,137

[22] Filed: Sep. 10, 1979

[51] Int. Cl.³ .................................. B65D 25/28
[52] U.S. Cl. ........................ 215/100 A; 150/48
[58] Field of Search ............ 150/48, 0.5; 215/100 A, 215/1 C; 220/94 R, 95, 91

[56] References Cited

U.S. PATENT DOCUMENTS

| 2,823,720 | 2/1958 | Svec | 150/3 |
| 3,100,576 | 8/1963 | Frank | 220/94 R UX |
| 3,195,758 | 7/1965 | Beacham | 215/100 A |
| 3,338,285 | 8/1967 | Jaster | 150/3 |
| 3,358,877 | 12/1967 | Eckhoff | 220/95 |
| 3,448,893 | 6/1969 | Jeanneau | 220/91 |

FOREIGN PATENT DOCUMENTS 889343  2/1962  United Kingdom ............... 220/94 R Primary Examiner—Donald F. Norton
Attorney, Agent, or Firm—Roy C. Hopgood; John M. Calimafde; Charles W. Neill

[57] ABSTRACT

This specification discloses apparatus for connecting handles, or other parts, to plastic injection blow molded containers such as buckets, pitchers and other articles; the handles being parts that are not molded integral with the blow molded containers, but that are stiffer and stronger parts than the blow molded walls of the containers. The blow molded element is made with recesses for receiving the bales, or handles, and is made flexible so that end portions of the handles can be forced into the recesses by expanding the entrances to the recesses. The fit is designed to give the maximum undercut that can be pulled out of the mold without damaging the part. The mating part can be made to snap in with a design that minimizes the ability to remove it, such as for a paint can.

7 Claims, 7 Drawing Figures

U.S. Patent    Aug. 4, 1981    4,281,770
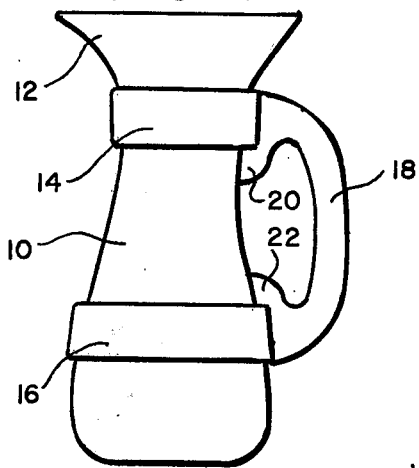
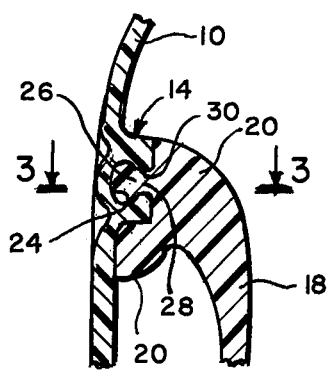
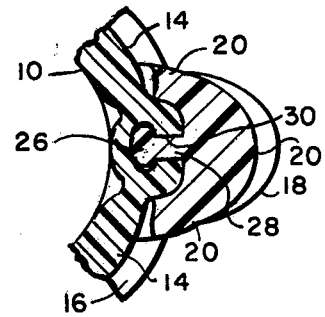
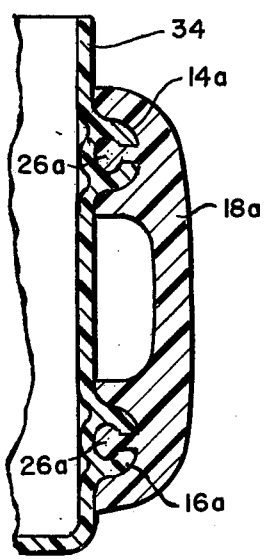
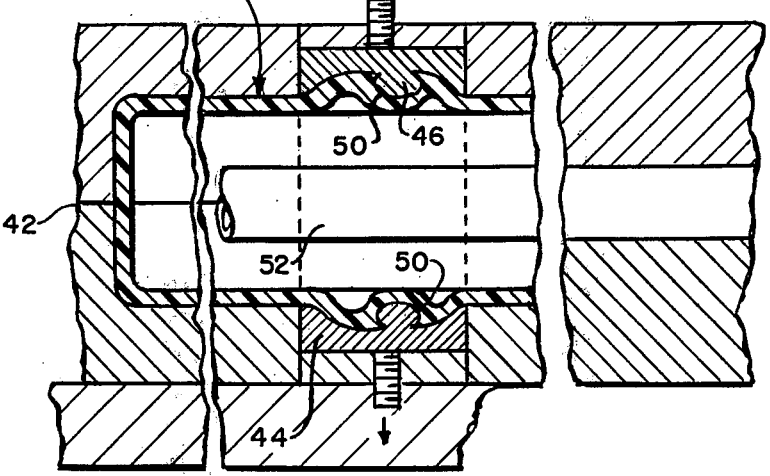
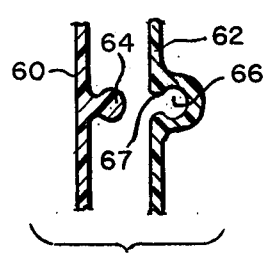
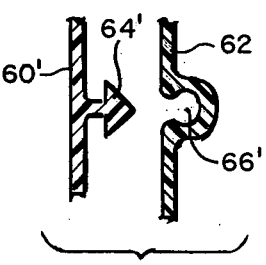

BLOW MOLDED CONTAINER WITH SEPARATE HANDLE

BACKGROUND AND SUMMARY OF THE INVENTION

One of the economies in making injection blow molded articles, especially containers, is that the walls are thin and generally flexible. Providing handles for the containers presents problems in that much more complicated molds are necessary and procedures become more complicated and result in use of more material and reduced molding speed, or multiple stage secondary operations, both of which increase the cost.

This invention molds the container in the usual way but the recesses in the walls of the container are shaped to receive an enlarged end of a separately molded handle with enlargements on both ends of the handle shaped to fit into the recesses but shaped to expand the entrances to the recesses so as to insert the ends of the handles which expand the entrances into the recesses for connecting and disconnecting the handles.

Other objects, features and advantages of the invention will appear or be pointed out as the description proceeds.

BRIEF DESCRIPTION OF DRAWING

In the drawing forming a part hereof, in which like reference characters indicate corresponding parts in all the views;

FIG. 1 shows a side elevation of a pitcher made in accordance with this invention;

FIG. 2 is a vertical sectional view of the upper end of the handle shown in FIG. 1; the sectional view being on an enlarged scale;

FIG. 3 is a sectional view taken on the line 3—3 of FIG. 2;

FIG. 4 is a sectional view showing a modified form of the handle shown in FIGS. 1-3;

FIG. 5 is a sectional view showing the way in which a small bucket can be injection blow molded to accomodate a handle which fits into external sockets on opposite sides of the bucket;

FIG. 6 shows an interlocking construction that can be easily disengaged; and

FIG. 7 shows an interlocking construction that is difficult to disengage.

DESCRIPTION OF PREFERRED EMBODIMENT

FIG. 1 shows a blow molded plastic pitcher 10 and circumferential band or bosses 14 and 16 where the pitcher is of greater thickness than elsewhere. A handle 18, preferably molded of the same kind of plastic as the pitcher 10, and with upper and lower parts 20 and 22 which are shaped to fit against parts of the bands or bosses 14 and 16 and against the area of the pitcher 10 below the upper boss 14 and the corresponding area of the surface of the pitcher above the boss 16.

At the portions of the bosses 14 and 16, where the handle 18 is to be connected with the pitcher 10, there is a recess 24 into which a knob 26 can be inserted and the knob 26 is connected with a neck 28.

A passage 30 provides access to the recess 24. This passage 30 is smaller than the knob 28 but the knob can be inserted through the passage 30 by stretching the plastic of the band or boss 14. With the knob 26 fully inserted into the recess 24, the walls of the passage 30 spring back to their original position and the upper portion 20 of the handle 18 is secured to the pitcher 10.

FIG. 4 shows a modified construction in which a handle 18a has knobs 26a which fit into recesses in portions of the wall of a vessel 34 in substantially the same way as shown in FIGS. 2 and 3 but with the handle 18a shaped so that it engages the areas of the wall of the vessel 34 which are provided with the passages and sockets into which the knobs 26a are inserted. The handle 18a is shown extending both above and below each of the bands 14a and 16a. The drawing thus far described is concerned with handles for pitchers.

FIG. 5 shows a modified form of the invention in which a container 38 is blown in a mold 40 with the upper and lower halves of the mold 40 separating from one another along a plane 42. Inserts 44 and 46, at diametrically opposite locations in the lower and upper halves of the mold 40 form recesses 46 at opposite sides of the container for receiving opposite ends of a bale type handle such as commonly used on buckets.

The materials of the container 38 must cool sufficiently, in the cavity of the mold 40, so that the knobs can pull out of the recesses 46 without permanently distorting the recesses. Knobs 50 are disclosed on opposite sides of the blow mold cavity along a line which extends in the same direction as the relative movement of the mold parts as they separate from one another to release the container 38.

When the mold 40 opens, in accordance with conventional practice, a core rod 52 moves upward and pulls the molded container 38 loose from the lower knob 50 of the lower stationary portion of the mold 40. The container 38 has a thickened circumferential band with the band having first and second bosses spaced apart 180 degrees.

FIG. 6 is a fragmentary view showing elements 60 and 62 which can be connected together by inserting a knob or boss 64 into a recess 66 which is of similar cross section to the knob 64 and provided with an entrance 67 of somewhat smaller cross section than the maximum cross section of the knob 64. These parts 60 and 62 can be easily connected and disconnected because of the shape of the knob 64 which exerts a cam action to stretch the entrance 67. They can also be more easily assembled because of the shape and cam action.

For constructions which are to be connected in situations where a strong connection is desirable, the part 60' can be connected to the part 62' by using a boss 64' which has straight intersecting sides which exert less cam action to disengage the projection 64' from a socket 66' and this provides a stronger connection. However, the corners of the element 64' must be made of material that is resilient enough to bend when the part 60' is made in a blow mold.

The preferred embodiment of the invention has been illustrated and some modifications have been shown, but other changes can be made and the invention can be used in different combinations without departing from the scope of the appended claims.

What is claimed is:

1. A plastic blow molded container made of stretchable material having side walls bottom, and an opening through which the contents of the container can be removed therefrom, a boss comprising an integral construction with the side walls of the blow molded container, a hollow chamber within the boss and with an entrance passage into the hollow chamber at the end of the hollow chamber which is remote from an outside surface of the container, the entrance passage being of less transverse cross section than the interior of the chamber normal to the longitudinal axis of said entrance passage, a handle that is a different piece from the container, a projection on the handle for insertion into the hollow chamber in the boss, the portion of the projection that first enters the hollow chamber being larger than the cross section of said entrance passage, and the walls of the chamber that terminate at the sides of said entrance passage being flexible and elastic enough to yield and stretch to pass the end of the projection into a portion of the chamber that is larger than the cross section of the passage.

2. The blow molded container described in claim 1 characterized by there being two bosses vertically spaced along the side of the container and each of said bosses having surfaces that extend outward from the container and that contact with abutting surfaces of the handle, at least one of said bosses being in position to support the handle above it and thereby reduce the vertical component of the stress to which the projections are subjected by a load exerted within the hollow chamber.

3. The blow molded container described in claim 1 characterized by a portion of the handle bearing against the side of the container and being held in contact with the outside of the boss by the projection that extends into the boss, the handle having surfaces that extend around the outside of the boss and into contact with the side of the container adjacent to the boss to prevent angular movement of the handle with respect to the portion of the handle that extends into the boss and that connects the handle to the container.

4. The blow molded container described in claim 1 characterized by the handle that is held against the side of the container by the projection that extends into the boss, having surfaces that extend around the outside of the boss and into contact with the sides of the boss to prevent angular movement of the handle with respect to the portion of the handle that connects the handle to the container.

5. The blow molded container described in claim 1 characterized by the projection being of one-piece construction with the handle.

6. The blow molded container described in claim 1 characterized by the container having a second boss of integral construction with a side wall of the container and at a spaced distance from the first boss for receiving a portion of the handle that is spaced from the first connection of the handle to the container.

7. The blow molded container described in claim 1 characterized by the container being of generally circular cross section and having a circumferential band where the wall of the container is thicker than elsewhere and a second boss on the side of the container at a 180 degree spacing from the first boss, both of the bosses being part of the band.

* * * * *